(12) United States Patent
Cho et al.

(10) Patent No.: US 8,866,849 B1
(45) Date of Patent: Oct. 21, 2014

(54) PORTABLE DEVICE SUPPORTING VIDEOTELEPHONY OF A HEAD MOUNTED DISPLAY AND METHOD OF CONTROLLING THEREFOR

(71) Applicant: LG Electronics Inc., Seoul (KR)

(72) Inventors: Eunhyung Cho, Seoul (KR); Sinae Chun, Seoul (KR); Jongho Kim, Seoul (KR); Jihwan Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 14/080,316

(22) Filed: Nov. 14, 2013

(30) Foreign Application Priority Data

Aug. 28, 2013 (KR) .................. 10-2013-0102325

(51) Int. Cl.
*G09G 5/00* (2006.01)
*G06T 19/00* (2011.01)
*G02B 27/01* (2006.01)

(52) U.S. Cl.
CPC .......... *G06T 19/006* (2013.01); *G02B 27/0172* (2013.01); *G02B 27/017* (2013.01); *G09G 2340/125* (2013.01)
USPC ............................... 345/633; 345/629; 345/8

(58) Field of Classification Search
CPC ............... G06T 19/006; G02B 27/017; G02B 27/0172; G09G 2340/125
USPC ............................... 345/633, 629, 8
See application file for complete search history.

(56) References Cited

U.S. PATENT DOCUMENTS

| | | | |
|---|---|---|---|
| 7,113,151 B2 * | 9/2006 | Kinebuchi | 345/8 |
| 2002/0126066 A1 * | 9/2002 | Yasukawa et al. | 345/8 |
| 2005/0264527 A1 * | 12/2005 | Lin | 345/156 |
| 2006/0284791 A1 | 12/2006 | Chen et al. | |
| 2011/0221672 A1 | 9/2011 | Osterhout et al. | |
| 2011/0242103 A1 * | 10/2011 | Han et al. | 345/419 |
| 2012/0032877 A1 * | 2/2012 | Watkins et al. | 345/156 |
| 2012/0113141 A1 * | 5/2012 | Zimmerman et al. | 345/633 |
| 2012/0113209 A1 * | 5/2012 | Ritchey et al. | 348/14.02 |
| 2012/0151416 A1 * | 6/2012 | Bell et al. | 715/848 |
| 2012/0170089 A1 | 7/2012 | Kim et al. | |
| 2012/0249741 A1 * | 10/2012 | Maciocci et al. | 348/46 |
| 2012/0299950 A1 * | 11/2012 | Ali et al. | 345/592 |
| 2012/0302289 A1 * | 11/2012 | Kang | 455/557 |
| 2012/0327116 A1 * | 12/2012 | Liu et al. | 345/633 |
| 2013/0017789 A1 | 1/2013 | Chi et al. | |
| 2013/0031511 A1 * | 1/2013 | Adachi | 715/825 |
| 2013/0044128 A1 | 2/2013 | Liu et al. | |
| 2013/0050258 A1 * | 2/2013 | Liu et al. | 345/633 |
| 2013/0057642 A1 | 3/2013 | Catchpole | |
| 2013/0083003 A1 * | 4/2013 | Perez et al. | 345/419 |
| 2013/0083009 A1 * | 4/2013 | Geisner et al. | 345/419 |

(Continued)

OTHER PUBLICATIONS

International Search Report for Appl. No. PCT/KR2013/010494 dated May 20, 2014.

*Primary Examiner* — David T Welch
(74) *Attorney, Agent, or Firm* — Birch, Stewart, Kolasch & Birch, LLP (57) ABSTRACT

A method of controlling a portable device according to one embodiment of the present specification includes the steps of pairing with a head mounted display (HMD), detecting a first position of the paired HMD when an incoming call is received, configuring marker information corresponding to the incoming call according to the detected first position of the paired HMD, and transmitting an augmented reality image corresponding to the marker information to the paired HMD.

18 Claims, 7 Drawing Sheets

(56) References Cited

U.S. PATENT DOCUMENTS

2013/0093789 A1* 4/2013 Liu et al. .................. 345/633
2013/0297460 A1* 11/2013 Spivack .................. 705/27.2
2013/0342564 A1* 12/2013 Kinnebrew et al. .......... 345/619

* cited by examiner

PORTABLE DEVICE SUPPORTING VIDEOTELEPHONY OF A HEAD MOUNTED DISPLAY AND METHOD OF CONTROLLING THEREFOR

Pursuant to 35 U.S.C. §119(a), this application claims the benefit of the Korean Patent Application No. 10-2013-0102325, filed on Aug. 28, 2013, which is hereby incorporated by reference as if fully set forth herein.

BACKGROUND OF THE INVENTION

1. Field of the Invention

The present specification relates to a portable device, and more particularly, to a portable device providing marker information necessary for a head mounted display to perform a videotelephony.

2. Discussion of the Related Art

An augmented reality technology of which a real object and a virtual object are mixed together enables a user to see a real image together with an augmented reality image and then provides additional image in addition to a sense of reality. For instance, in case that an incoming call is received by a smart phone, a head mounted display can display a face of a sender of the incoming call as an augmented reality image on a position of the smart phone using the augmented reality technology. By doing so, a user of the head mounted display can perform a videotelephony in a manner of looking at the face of the sender.

An augmented reality image can be displayed in case that a marker corresponding to an augmented reality image is detected. The augmented reality image may correspond to a 3-dimensional image and a direction of the 3 dimensional-image can vary according to a direction of the marker. Hence, a portable device displays a marker different from each other according to a sender of an incoming call and should control the direction of the marker according to a position or a direction of the head mounted display. Hence, a method of transmitting a marker information to the head mounted display in a manner of adaptively generating the marker information according to a situation is required.

SUMMARY OF THE INVENTION

Accordingly, the present specification is directed to an apparatus and method thereof that substantially obviate one or more problems due to limitations and disadvantages of the related art.

An object of the present specification is to provide a portable device transmitting marker information of an augmented reality image and a method of controlling therefor. In particular, in the present specification, it is necessary for the portable device to provide a method of adaptively changing the marker information transmitted according to a user or a position of a paired head mounted display.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a portable device includes a communication unit configured to receive an incoming call in a manner of being paired with a head mounted display (HMD) and configured to transmit an information, a sensor unit configured to detect a position of the HMD, a display unit, and a controller configured to control the communication unit, the sensor unit, and the display unit, if the HMD is paired with the portable device, the controller configured to configure a marker information corresponding to the incoming call according to a first position of the HMD, the controller configured to transmit an augmented reality image corresponding to the marker information to the HMD.

To achieve these and other advantages and in accordance with the purpose of the present specification, as embodied and broadly described, according to one embodiment, a method of controlling a portable device includes the steps of pairing with a head mounted display (HMD), if an incoming call is received, detecting a first position of the paired HMD, configuring a marker information corresponding to the incoming call according to the detected first position, and transmitting an augmented reality image corresponding to the marker information to the HMD.

According to the present specification, a portable device can generate marker information corresponding to an augmented reality image and transmit the marker information.

According to the present specification, a portable device can adaptively change marker information according to a user or a position of a paired head mounted display.

According to the present specification, a portable device detects a position of a head mounted display before a videotelephony is started and can configure marker information.

According to the present specification, a portable device can transmit information on a form of the portable device as marker information.

According to the present specification, if a user or a position of a paired head mounted display changes, a portable device can modify marker information in manner of tracking a changed position.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

While the embodiments have been concretely described with reference to the attached diagrams and the contents written on the diagrams, a scope of claims may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, a portable device may correspond to a device including a display unit. For instance, the portable device may include a smartphone, a smart pad, a notebook, a tablet computer, a music player, a smart table, a monitor, or a television. In the present specification, a head mounted display may include a wearable device capable of displaying visual information in a manner of being put on a body of a user.

Figure 1:
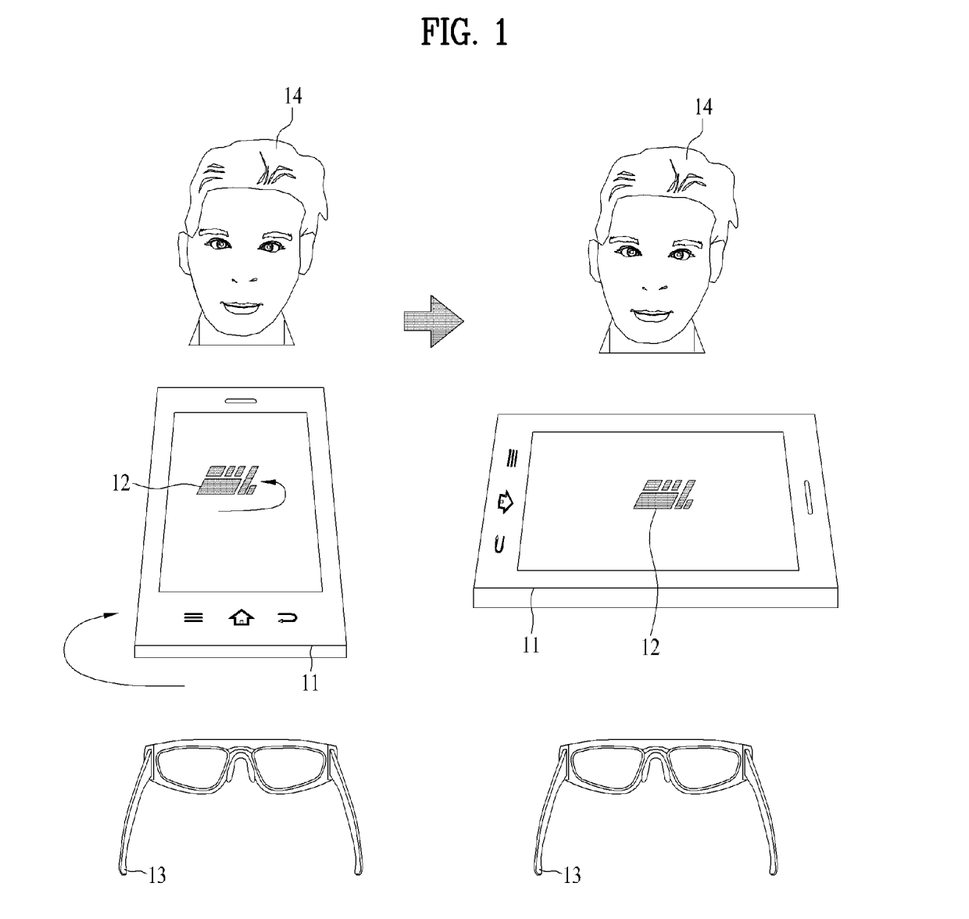
FIG. 1 is a diagram of a method of providing a videotelephony of a portable device according to one embodiment of the present specification.

FIG. 1 is a diagram of a method of providing a videotelephony of a portable device according to one embodiment of the present specification. A portable device can receive an incoming call. The portable device can display information on a sender of the incoming call. And, the portable device can provide the information on the sender of the incoming call to a head mounted display in a manner of pairing with the head mounted display.

If a head mounted display is paired with a portable device, the portable device can display a marker of an augmented reality image and the head mounted display detects the marker displayed in the portable device and can display an augmented reality image corresponding to the marker. The portable device detects a user or a position of the head mounted display and can adaptively change a position of the marker according to a detected position. Although the position of the head mounted display is explained as an example in the following description, the present specification can be similarly applied to a position of a user as well. The portable device can determine a direction of the marker in order for a front face of a sender to be displayed in the paired head mounted display.

Referring to the left of FIG. 1, the portable device 11 can receive an incoming call. Having received the incoming call, the portable device 11 can detect a first position of the paired head mounted display 13. In this case, the first position may mean a relative position of the head mounted display paired with the portable device on the basis of the portable device. For instance, the portable device 11 sets a virtual baseline and can detect the paired head mounted display 13 at a position rotated from the baseline by a first angle.

The portable device 11 can configure a direction of a marker 12 to make a front side of an augmented reality image 14 corresponding to the marker 12 face the first position. In FIG. 1, the augmented reality image 14 is an image displayed in the head mounted display 13 in response to the marker 12. The portable device can configure the direction of the marker 12 to the direction rotated by the first angle from the baseline.

If a response for the incoming call is determined and a call is started, the portable device rotates the marker 12 to the configured direction and then displays the marker 12. For instance, if the head mounted display 13 is situated at a position where the head mounted display forms the first angle clockwise from the baseline of the portable device 11, the portable device 11 can display the marker 12 after rotating the marker 12 clockwise by the first angle.

And, the portable device can transmit at least one of marker information and an augmented reality image to the paired head mounted display 13. The marker information may include the information on a form of the marker and a direction of the marker. And, the augmented reality image can include information on a sender of an incoming call. For instance, the augmented reality image can include a name of the sender, a telephone number, memo, a picture, and a videotelephony image.

The head mounted display 13 detects the marker 12 displayed in the portable device 11 and can perform a videotelephony using at least one of the marker information and the augmented reality image transmitted from the portable device. The head mounted display 13 can display the augmented reality image 14 in response to the detected marker 12. The head mounted display 13 can display the augmented reality image in a manner of rotating the augmented reality image according to the direction of the displayed marker 12. Hence, the head mounted display 13 can display the front side of the videotelephony image of the sender of the incoming call as the augmented reality image 14.

Referring to the right of FIG. 1, it indicates a state that the portable device shown in the left of FIG. 1 has rotated clockwise by 90 degrees. If the portable device rotates in the middle of performing a videotelephony, the portable device 11 can rotate the marker 12 in the opposite direction as much as the portable device has rotated. In particular, if the portable device rotates clockwise by 90 degrees in the middle of performing a videotelephony, the portable device 11 can display the displayed marker 12 in a manner of rotating the maker anticlockwise by 90 degrees. In other word, the portable device can change the information on the display direction included in the marker information to the direction rotated anticlockwise by 90 degrees. The portable device can change the marker information to make the front side of the augmented reality image face the head mounted display 13. By doing so, the portable device can make the augmented reality image 14 displayed in the head mounted display 13 maintain the front side.

The portable device 11 can detect the first position of the head mounted display 13 until a videotelephony is ended. If the first position is changed to a second position, the portable device can rotate the displayed marker 12 according to the changed second position. In other word, the portable device 11 can change the display direction of the marker included in the marker information to make the front side of the augmented reality image face the second position. The portable device can rotate the displayed marker 12 in response to an angle between the first position and the second position.

By doing so, a user wearing the head mounted display 13 can perform a videotelephony in a manner of looking at the front side of a face of the other party while the videotelephony is continued to be performed. And, in case that the first position of the user changes, the user can consistently look at the front side of the face of the other party.

Figure 2:
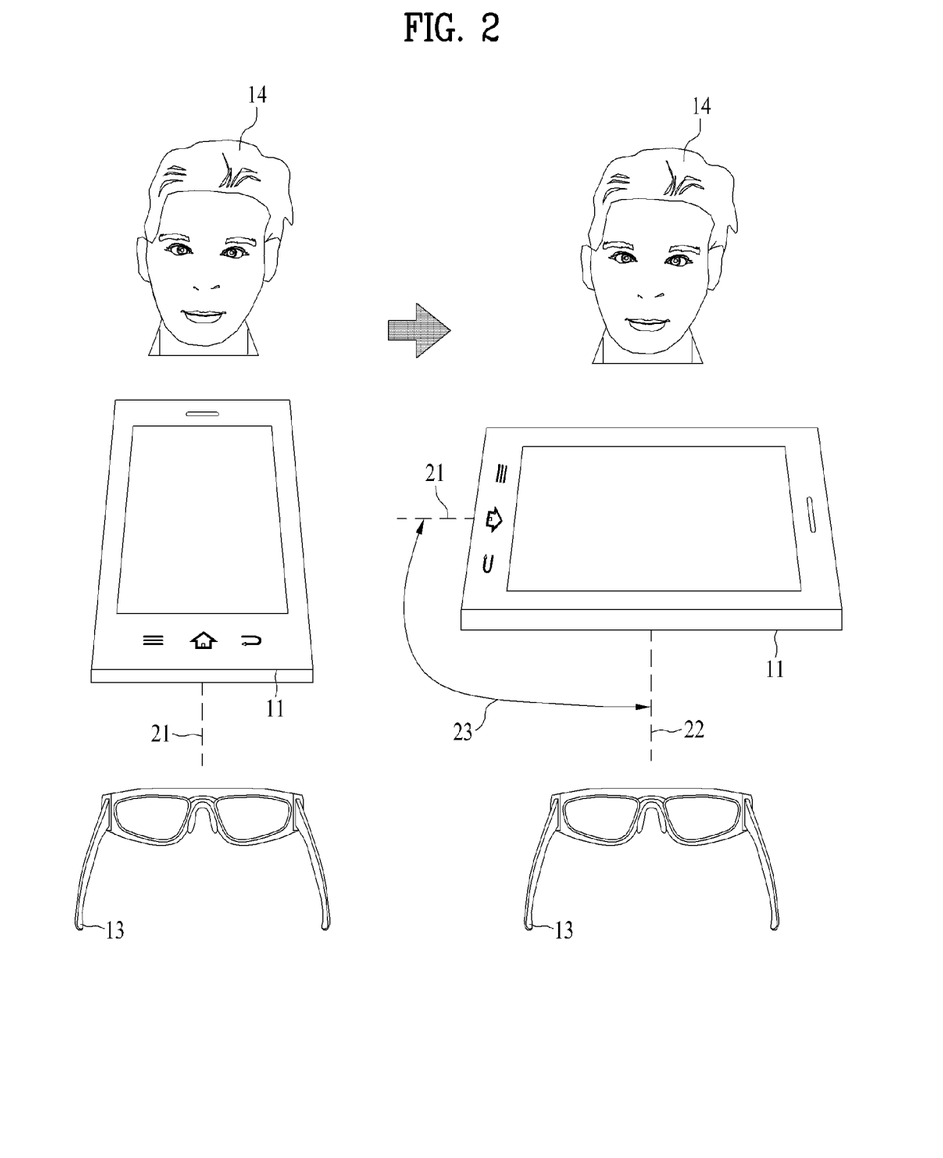
FIG. 2 is a diagram of a method of providing a videotelephony of a portable device according to a different embodiment of the present specification.

FIG. 2 is a diagram of a method of providing a videotelephony of a portable device according to a different embodiment of the present specification. The portable device can receive an incoming call. The portable device can display information on a sender of the incoming call. And, the portable device can provide the information on the sender of the incoming call to a head mounted display in a manner of pairing with the head mounted display. The head mounted display can detect a form of the portable device with a marker of an augmented reality image. The head mounted display detects the form of the portable device and can display the augmented reality image corresponding to the form of the portable device. The portable device detects a position of the head mounted display and can transmit marker information including information on a reference shape of the portable device to the head mounted display according to the detected position. The portable device can determine the reference shape to make a front side of a face of a sender to be displayed in the paired head mounted display. In particular, the reference shape of the portable display can be defined as a form of the portable device seen from a direction to which the front side of the displayed augmented reality image faces.

Referring to the left of FIG. 2, the portable device 11 can receive an incoming call. Having received the incoming call, the portable device 11 can detect a first position of the paired head mounted display 13. In this case, the first position may mean a relative position of the head mounted display paired with the portable device on the basis of the portable device. For instance, the portable device 11 sets a virtual baseline 21 and can detect the paired head mounted display 13 at a position rotated from the baseline by a first angle. Referring to the left of FIG. 2, since the head mounted display 13 is positioned at a direction of the baseline, a first angle becomes 0 degree.

The portable device 11 can configure the information on the reference shape of the portable device with the maker information to make a front side of an augmented reality image 14 face the first position. In FIG. 2, the augmented reality image 14 is an image displayed in the head mounted display 13 in response to the reference shape of the portable device. The portable device can configure the reference shape of the portable device to a form rotated by 0 degree, which is the first angle, from the baseline.

And, the portable device can transmit at least one of marker information and the augmented reality image to the paired head mounted display 13. The marker information may include information on the reference shape of the portable device. Moreover, the marker information may further include information on a form according to a plurality of angles of the portable device. In particular, the marker information may further include the information on the form of the portable device according to an angle between the portable device and the head mounted display identified by a camera unit of the head mounted display. And, the augmented reality image can include information on a sender of an incoming call. For instance, the augmented reality image can include a name of the sender, a telephone number, memo, a picture, and a videotelephony image.

The head mounted display 13 detects the form of the portable device 11 with a marker and can perform a videotelephony using at least one of the marker information and the augmented reality image transmitted from the portable device. The head mounted display 13 can display the augmented reality image 14 in response to at least one of the marker information and the detected form of the portable device. The head mounted display 13 can display the augmented reality image in a manner of rotating the augmented reality image based on the reference shape of the portable device and the detected form of the portable device. Hence, the head mounted display 13 can display the front side of the videotelephony image of the sender of the incoming call as the augmented reality image 14.

The right of FIG. 2 indicates a state that the portable display device has rotated clockwise by 90 degrees. A baseline 21 of the portable device can rotate clockwise by 90 degrees as the portable device rotates. By doing so, the head mounted display 13 can be positioned at the left side of the portable device 11. Since the first position of the head mounted display 13 is a relative position for the portable device 11, the first position can change as the portable device 11 rotates. In other word, the head mounted display 13 can be positioned at a changed first position 22 on the basis of the portable device 11 and the first angle 23 between the baseline 21 and the first position 22 may form 90 degrees.

If the portable device rotates in the middle of performing a videotelephony, the portable device 11 can transmit information on the reference shape to the head mounted display 13 in a manner of changing the information on the reference shape. The portable device 11 updates one of the shapes of the portable device according to a plurality of angles included in the marker information as a reference shape and can transmit information on the updated reference shape to the head mounted display 13 in a manner of including the information on the updated reference shape in the marker information. In particular, in the right of FIG. 2, the portable device can update the form of the portable device seen from the left of the portable device as the reference shape. Hence, referring to the right of FIG. 2, a camera unit of the head mounted display can detect the portable device identical to the reference shape. Hence, the front side of the augmented reality image can be displayed in the head mounted display.

As a different embodiment, the portable device may transmit information on the first angle 23 to the head mounted display 13. The head mounted display can update the reference shape based on the transmitted information on the first angle 23. Referring to the right of FIG. 2, since the first angle corresponds to 90 degrees clockwise, the head mounted display can update the form of the portable device seen from the left of the portable device as the reference shape among the shapes of the portable device seen from a plurality of angles included in the marker information. Hence, in the right of FIG. 2, a camera unit of the head mounted display can detect the shape of the portable device identical to the reference shape. By doing so, the portable device 11 can make the augmented reality image 14 displayed in the head mounted display 13 maintain the front side.

The portable device 11 can detect the first position of the head mounted display 13 until a videotelephony is ended. If the first position changes, the portable device can update the information on the reference shape according to the changed first position. In other word, a user wearing the head mounted display 13 can perform a videotelephony in a manner of looking at the front side of a face of the other party while the videotelephony is continued to be performed. And, in case that the first position of the user changes, the user can consistently look at the front side of the face of the other party.

Figure 3:
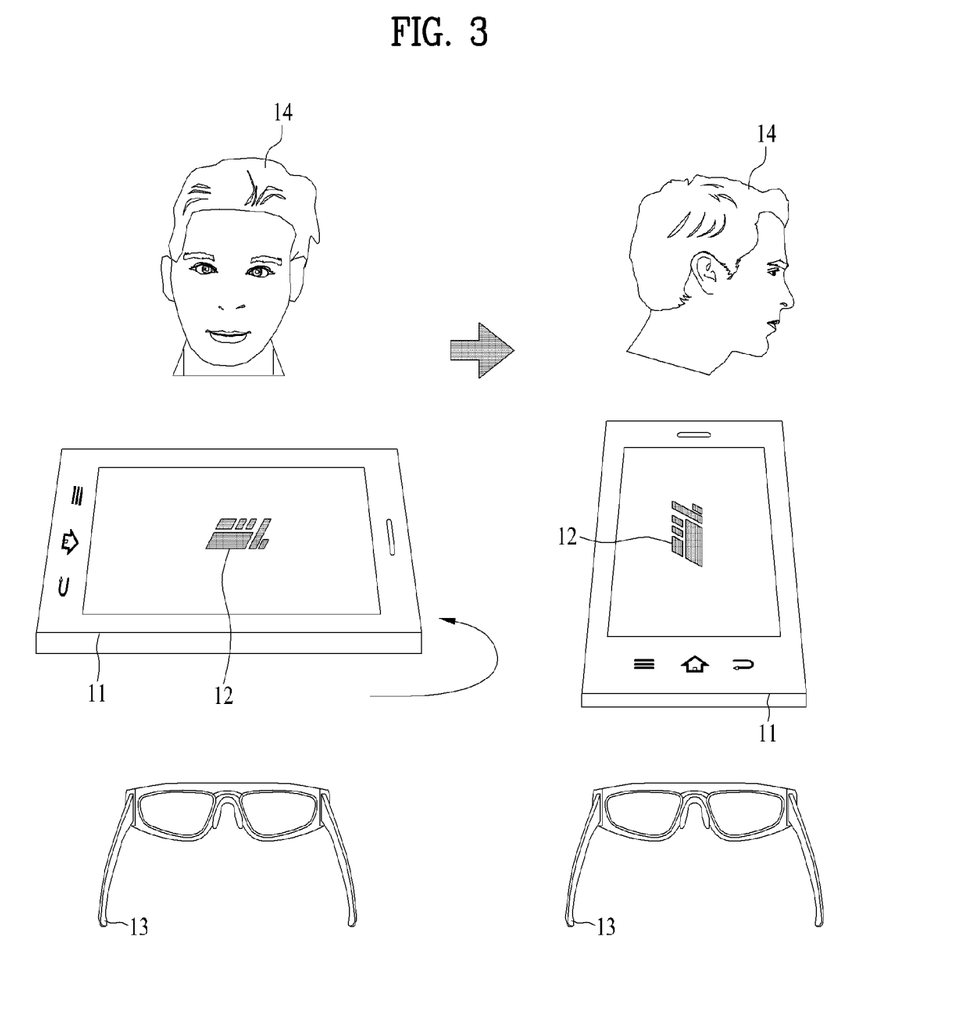
FIG. 3 is a diagram of a method of providing a videotelephony of a portable device according to a different embodiment of the present specification.

FIG. 3 is a diagram of a method of providing a videotelephony of a portable device according to a different embodiment of the present specification. In case that a user rotates the portable device to see a side or a reverse side of an augmented reality image in the middle of performing a videotelephony, the portable device can maintain a displayed marker in a manner that the marker is not rotated. In particular, if a first position of the head mounted display identified by the portable device is changed to a second position due to a rotation or a movement of the portable device, the portable device can maintain the displayed marker without rotating or moving the displayed marker. As a different embodiment, if the first position of the head mounted display identified by the portable device is changed to the second position due to the rotation or the movement of the portable device, the portable device can maintain the marker information including the information on the reference shape of the portable device without updating the marker information.

In case that the first position of the head mounted display is changed to the second position, a method of judging whether a position change corresponds to a relative position change between the portable device and the head mounted display or an absolute position change of the head mounted display is explained in the following description.

The portable device can detect a position change of the head mounted display using a sensor unit. The portable device can detect that the first position of the portable device is changed to the second position not because the head mounted display has moved but because the portable device has rotated or moved.

For instance, the portable device can determine whether the position change of the head mounted display is caused by the movement of the portable device using an image sensor. The portable device can determine whether the head mounted display has moved or the portable device has moved based on a background image of the head mounted display changed to the second position from the first position. If the background image of the head mounted display changes, the portable device can determine that the position of the head mounted display has changed due to the movement of the head mounted display. If the background image of the head mounted display does not change, the portable device can determine that the position of the head mounted display has changed due to the movement of the portable device.

As a different embodiment, the portable device can determine whether the position change of the head mounted display is caused by the movement of the portable device using a gyro sensor. When the position of the head mounted display is changed from the first position to the second position, the portable device can sense whether the portable device rotates or moves using the gyro sensor of the portable device. If a rotation or a movement of the portable device is sensed, the portable device can determine that the position of the head mounted display has changed due to the rotation or the movement of the portable device.

As a different embodiment, the portable device can determine whether the position change of the head mounted display is caused by the movement of the portable device by receiving position information of the head mounted display from the head mounted display. The portable device can judge whether an absolute coordinate of the head mounted display is changed by receiving GPS (global positioning system) position information from the head mounted display. If the absolute coordinate of the head mounted display is not changed, the portable device can determine that the position of the head mounted display has changed due to the rotation or the movement of the portable device.

Referring to the left of FIG. 3, the portable device 11 can detect that the head mounted display 13 is positioned at the left of the portable device. If an incoming call is received, the portable device 11 can display a marker 12 in a manner that the maker faces a direction at which the head mounted display is detected. And, instead of displaying the marker, the portable device determines a reference shape of the portable device and can transmit the reference shape to the head mounted display in a manner of including the reference shape in the marker information. In this case, the reference shape of the portable device may correspond to a shape of the portable device seen from the left of the portable device.

The portable device 11 can display the marker 12 in a manner of rotating the marker or can configure the reference shape included in the marker information to make the front side of the augmented reality image 14 to be displayed in the head mounted display. The head mounted display 13 can display the augmented reality image 14 in a region adjacent to the portable device 11 based on the marker 12 displayed in the portable display or the received marker information.

As depicted in the right of FIG. 3, if the portable device moves or rotates in the middle of performing a videotelephony, the portable device can maintain a display direction of the marker 12 or information on a reference shape included in the marker information. By doing so, the portable device 11 can rotate the augmented reality image 14 displayed in the head mounted display 13. Referring to the right of FIG. 3, the portable device has rotated by 90 degrees anticlockwise compared to the left of FIG. 3. In particular, a relative position of the head mounted display 13 is changed from a first position, which is the left of the portable display device, to a second position, which is the bottom side of the portable device due to the rotation of the portable device. Hence, if the portable device detects a position change of the head mounted display 13, the portable device can maintain the display direction of the marker 12. And, the portable device can maintain the information on the reference shape included in the marker information without updating.

Hence, the head mounted display 13 can rotate the augmented reality image 14 by 90 degrees anticlockwise according to the detected marker or the maker information. This is because the head mounted display 13 has detected the marker 12 rotated by 90 degrees anticlockwise due to the rotation of the portable device. Or, this is because the head mounted display 13 has detected the shape of the portable device rotated by 90 degrees anticlockwise compared to the reference shape of the portable device transmitted to the head mounted display 13. In particular, the head mounted display 13 can determine a rotation angle of the augmented reality image 14 in a manner of comparing the received reference shape of the portable device with the shape of the portable device detected by the camera unit included in the head mounted display 13. And, the head mounted display 13 can rotate the augmented reality image 14 according to the determined rotation angle.

As mentioned in the foregoing description, the portable device and the head mounted display paired with the portable device can display the augmented reality image in various angles in the head mounted display.

Figure 4:
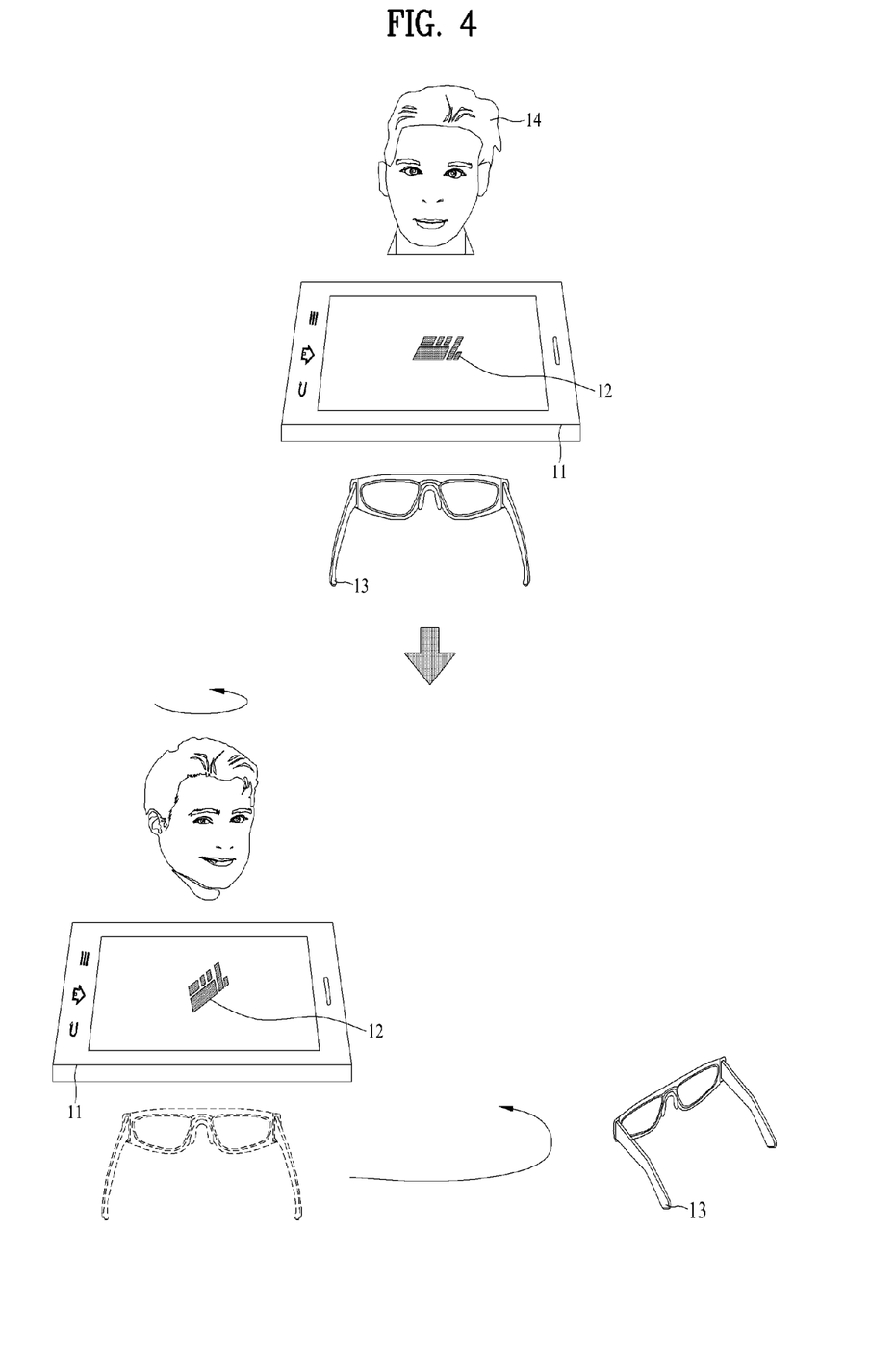
FIG. 4 is a diagram of a method of providing a videotelephony of a portable device according to a different embodiment of the present specification.

FIG. 4 is a diagram of a method of providing a videotelephony of a portable device according to a different embodiment of the present specification. If a user wants to continuously perform a videotelephony in a manner of moving a position of the user in the middle of performing the videotelephony, the portable device needs to continuously display a front side of an augmented reality image displayed in the head mounted display. This is because the user wants to look at the front side of a face of the other party while performing the videotelephony. Hence, in case that a position of the user is changed in the middle of performing the videotelephony, the portable device can rotate a displayed marker to a direction at which the user is positioned.

In case that a first position of the head mounted display identified by the portable device is changed to a second position due to the movement of the head mounted display, the portable device can rotate a marker in response to an angle between the first position and the second position. As a different embodiment, in case that the first position of the head mounted display identified by the portable device is changed to the second position due to the movement of the head mounted display, the portable device can update information on a reference shape of the portable device in response to the angle between the first position and the second position.

In case that the first position of the head mounted display is changed to the second position, a method of judging whether the position change corresponds to a relative position change between the portable device and the head mounted display or an absolute position change of the head mounted display is explained in the following description.

The portable device can detect a position change of the head mounted display using a sensor unit. The portable device can detect that the first position of the portable device is changed to the second position not because the portable device has rotated or moved but because the head mounted display has moved.

For instance, the portable device can determine whether the position change of the head mounted display is caused by the movement of the head mounted display using an image sensor. The portable device can determine whether the head mounted display has moved or the portable device has moved based on a background image of the head mounted display changed to the second position from the first position. If the background image of the head mounted display changes, the portable device can determine that the position of the head mounted display has changed due to the movement of the head mounted display. If the background image of the head mounted display does not change, the portable device can determine that the position of the head mounted display has changed due to the movement of the portable device.

As a different embodiment, the portable device can determine whether the position change of the head mounted display is caused by the movement of the head mounted display using a gyro sensor. When the position of the head mounted display is changed from the first position to the second position, the portable device can sense whether the portable device rotates or moves using the gyro sensor of the portable device. If a rotation or a movement of the portable device is not sensed, the portable device can determine that the position of the head mounted display has changed due to the movement of the head mounted display.

As a different embodiment, the portable device can determine whether the position change of the head mounted display is caused by the movement of the portable device by receiving position information of the head mounted display from the head mounted display. The portable device can judge whether an absolute coordinate of the head mounted display is changed by receiving GPS (global positioning system) position information from the head mounted display. If the absolute coordinate of the head mounted display changes, the portable device can determine that the position of the head mounted display has changed due to the movement of the head mounted display.

Referring to the top of FIG. 4, the portable device 11 can detect that the head mounted display 13 is positioned at the left of the portable device. If an incoming call is received, the portable device 11 can display a marker 12 in a manner that the maker faces a direction at which the head mounted display is detected. And, instead of displaying the marker, the portable device determines a reference shape of the portable device and can transmit the reference shape to the head mounted display in a manner of including the reference shape in the marker information. In this case, the reference shape of the portable device may correspond to a shape of the portable device seen from the left of the portable device.

The portable device 11 can display the marker 12 in a manner of rotating the marker or can configure the reference shape included in the marker information to make the front side of the augmented reality image 14 to be displayed in the head mounted display. The head mounted display 13 can display the augmented reality image 14 in a region adjacent to the portable device 11 based on the marker 12 displayed in the portable display 11 or the received marker information.

As depicted in the bottom of FIG. 4, if the head mounted display moves in the middle of performing a videotelephony, the portable device 11 can rotate a display direction of the marker 12 or update information on a reference shape included in the marker information. By doing so, the portable device 11 can rotate the augmented reality image 14 to make the front side of the augmented reality image 14 displayed in the head mounted display 13 face the head mounted display 13.

Referring to the bottom of FIG. 4, the head mounted display has rotated by 45 degrees anticlockwise compared to the top of FIG. 4. In particular, an absolute position of the head mounted display 13 is changed from a first position, which is the left of the portable display device, to a second position, which is the left upper side 45 degrees of the portable device due to the movement of the head mounted display. Hence, if the portable device 11 detects a position change of the head mounted display 13, the portable device can change the display direction of the marker 12. In particular, the portable device 11 can display the marker in a manner of rotating the marker 12 to make the maker face the second position of the head mounted display 13. Or, the portable device reconfigures the reference shape of the portable device with a shape of the portable device seen from the second position. And then, the portable device can update the information on the reference shape included in the marker information, which is transmitted to the head mounted display, with a reconfigured reference shape.

Hence, the head mounted display 13 can rotate the augmented reality image 14 by 45 degrees anticlockwise according to the rotated marker or the updated maker information. In particular, the head mounted display can make the front side of the augmented reality image 14 face the head mounted display 13.

This is because the head mounted display 13 has detected the marker 12 rotated by 45 degrees anticlockwise due to the movement of the head mounted display. Or, this is because the shape of the portable device detected by the head mounted display 13 is identical to the reconfigured and updated reference shape.

The head mounted display 13 can determine a rotation angle of the augmented reality image 14 in a manner of comparing the received reference shape of the portable device with the shape of the portable device detected by the camera unit included in the head mounted display 13. And, the head mounted display 13 can rotate the augmented reality image 14 according to the determined rotation angle. In the bottom of FIG. 4, since the detected shape of the portable device is identical to the reference shape, the head mounted display 13 determines the rotation angle as 0 and displays the augmented reality image 14 without rotating. In particular, the head mounted display 13 can display the front side of the augmented reality image 14.

As mentioned in the foregoing description, the portable device and the head mounted display paired with the portable device can rotate the augmented reality image to make the front side of the augmented reality image face the head mounted display in a manner of detecting a position change of the head mounted display.

Figure 5:
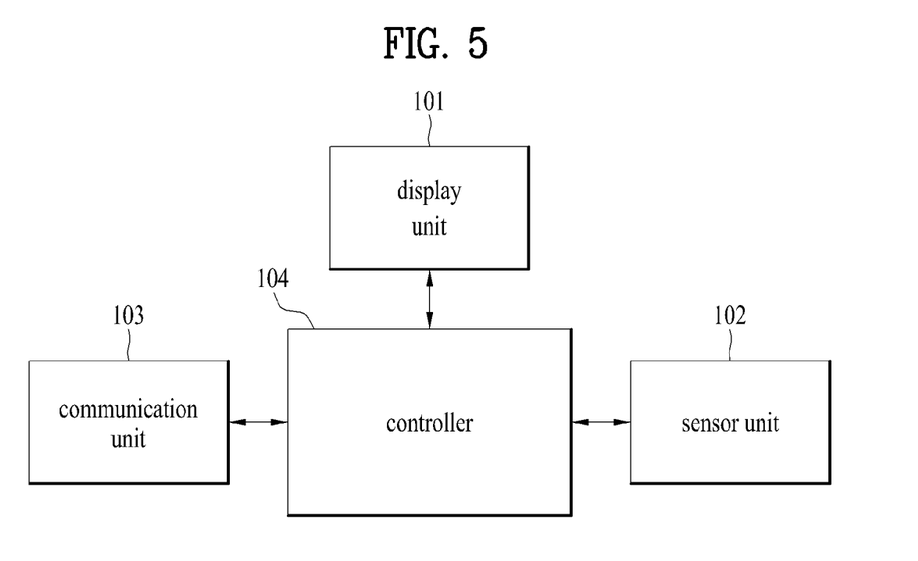
FIG. 5 is a block diagram of a portable device according to one embodiment of the present specification.

FIG. 5 is a block diagram of a portable device according to one embodiment of the present specification. The portable device can include a display unit 101, a sensor unit 102, a communication unit 103, and a controller 104.

The display unit 101 is configured to display a marker corresponding to an augmented reality image. The display unit 101 is configured to change a display direction of the marker according to a control command of the controller 104. In particular, the display unit 101 is configured to display the marker in a manner of rotating the maker to make the marker face a direction at which the head mounted display is positioned according to the control command.

The display unit 101 can include at least one selected from the group consisting of an organic light-emitting diode (OLED), a liquid crystal display (LCD), an E-ink, and a flexible display.

The sensor unit 102 is configured to detect a position of the head mounted display. The sensor unit 102 can detect a position change of the head mounted display. The sensor unit 102 can detect a direction at which the head mounted display is positioned on the basis of the portable device using an image sensor or a directional antenna. The sensor unit 102 can deliver information on the position of the head mounted display to the controller.

And, the sensor unit 102 can detect whether a relative position between the portable device and the head mounted display is changed or an absolute position of the head mounted display is changed. The sensor unit 102 can include the image sensor and a gyro sensor.

For instance, the sensor unit 102 can determine whether the relative position of the head mounted display is changed or the absolute position of the head mounted display is changed based on a background image of the head mounted display, which is changed from a first position to a second position, using the image sensor. In case that the background image of the head mounted display is changed, the sensor unit can determine that the absolute position of the head mounted display is changed. In case that the background image of the head mounted display is not changed, the sensor unit can determine that the relative position of the head mounted display is changed.

As a different embodiment, the sensor unit 102 can determine whether the relative position of the head mounted display is changed or the absolute position of the head mounted display is changed using the gyro sensor. When the head mounted display moves from the first position to the second position, the sensor unit 102 can sense whether the portable device is rotated or moved using the gyro sensor. If a rotation or a movement of the portable device is sensed, the sensor unit can determine that the relative position of the head mounted display is changed due to the rotation or the movement of the portable device. Or, if the rotation or the movement of the portable device is not sensed, the sensor unit can determine that the absolute position of the head mounted display is changed. The sensor unit 102 can deliver at least one selected from the group consisting of information on the position of the head mounted display, information on the relative position change, and information on the absolute position change.

The communication unit 103 is configured to deliver marker information and information on an augmented reality image to the head mounted display. And, the communication unit 103 is configured to receive GPS (global positioning system) information of the head mounted display from the head mounted display. The communication unit 103 can deliver the received GPS information to the controller.

The communication unit 103 of the portable device is configured to transceive a data with the head mounted display using a local area network (LAN) communication, WiFi, Bluetooth, and the like.

The controller 104 is configured to control the display unit 101, the sensor unit 102, and the communication unit 103 using the information delivered from the sensor unit 102 or the communication unit 103. When an incoming call is received, the controller 104 can detect a first position of the head mounted display using the sensor unit 102. The controller 104 can determine a rotation angle of a marker using the sensed first position. The controller 104 can determine the rotation angle of the marker to make a front side of an augmented reality image corresponding to the marker face the first position. The controller 104 can display the marker rotated by the rotation angle using the display unit. And, the controller 104 can transmit at least one of the marker information and the information on the augmented reality image to the head mounted display using the communication unit 103.

The controller 104 can receive GPS information of the head mounted display using the communication unit 103. The controller 104 may determine the first position of the head mounted display using the received GPS information.

The controller 104 can detect that the first position of the head mounted display is changed to the second position using the sensor unit. The controller 104 can change a display direction of a displayed marker based on the information on the second position or can update the marker information transmitted to the head mounted display based on the information on the second position. The controller 104 determines whether an absolute position of the head mounted display is changed or a relative position is changed according to embodiment. And, according to a result of the determination, the controller can maintain the direction of the displayed marker or can maintain the transmitted marker information without updating.

FIG. 5 is a block diagram according to one embodiment of the present specification. Blocks represented as being separated are depicted for elements of the portable device in a manner of being logically distinguished. Thus, the aforementioned elements of the portable device may be equipped with a single chip or a plurality of chips according to a design of the portable device.

The head mounted display according to one embodiment of the present specification can include a camera unit, a display unit, a communication unit, and a controller. The camera unit of the head mounted display can detect a marker displayed in the portable device. And, the camera unit can detect a shape of the portable device based on information on a reference shape included in marker information transmitted from the portable device.

The display unit of the head mounted display can display an augmented reality image corresponding to the marker or the marker information. The display unit can include an organic light-emitting diode (OLED), a liquid crystal display (LCD), or a projector.

The communication unit of the head mounted display can receive at least one of the maker information transmitted from the portable device or the information on the augmented reality image. The communication unit can deliver the received marker information and the information on the augmented reality image to the controller. The communication unit can transmit GPS information of the head mounted display to the portable device.

The controller of the head mounted display can display an augmented reality image in the display unit in response to the detected marker or the shape of the portable device. If a videotelephony is started, the head mounted display can display a face of a sender as an augmented reality image and can maintain the augmented reality image based on the marker of the portable device or the marker information until the videotelephony is ended.

Figure 6:
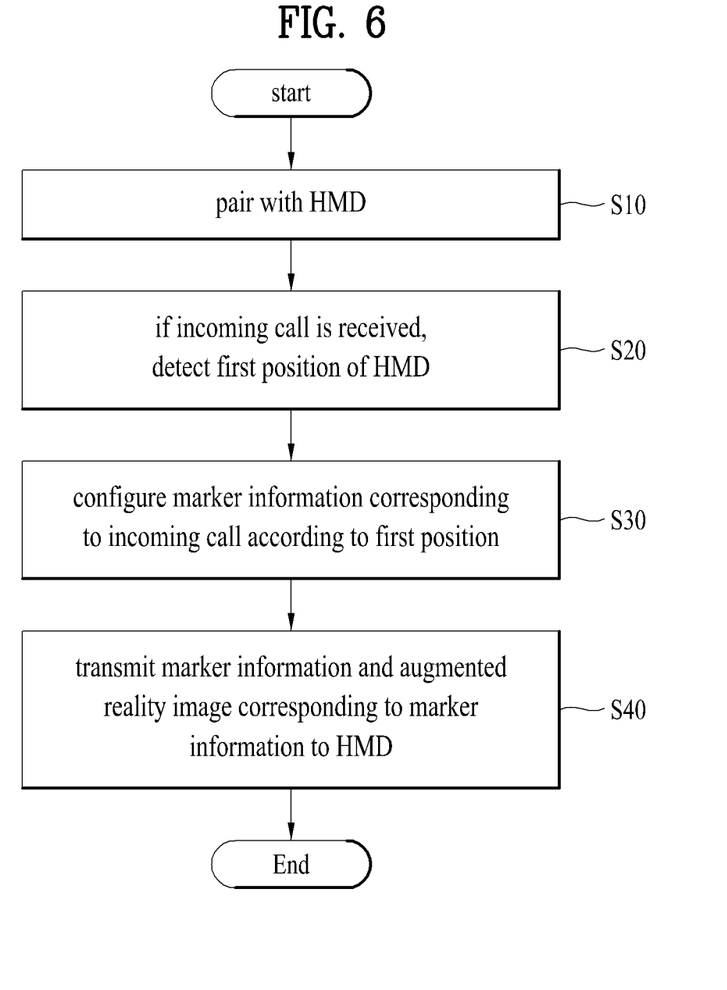
FIG. 6 is a flowchart for a method of controlling a portable device according to one embodiment of the present specification.

FIG. 6 is a flowchart for a method of controlling a portable device according to one embodiment of the present specification. The portable device can be paired with the head mounted display [S10]. The portable device can be paired with the head mounted display using a local area network (LAN), WiFi, or Bluetooth. A data can be transceived between the paired portable device and the head mounted display. For instance, the portable device may transceive a video data, an audio data, a GPS data, and the like with the head mounted display.

When an incoming call is received, the portable device can detect a first position of the head mounted display [S20]. As mentioned earlier in FIG. 1 to FIG. 4, the portable device can detect the first position of the head mounted display using a sensor unit or GPS information. The first position may mean a direction at which the head mounted display is positioned on the basis of the portable device. The portable device may not display a marker until the first position is detected.

The portable device can configure marker information corresponding to the incoming call according to the first position [S30]. The configuration for the marker information can be performed before a response for the incoming call occurs. As mentioned earlier in FIG. 1 to FIG. 4, the portable device can configure the marker information according to the first position. The marker information can include information on a marker displayed in the display unit of the portable device. The portable device can configure a display direction of the marker according to the detected first position. If the response for the incoming call occurs, the portable device can display the marker in a manner of rotating the marker according to the configured marker information. The portable device can display the maker in a manner that the marker faces the first position. By doing so, the front side of the augmented reality image displayed in the head mounted display in response to the marker can face the first position.

According to a different embodiment, the marker information can include information on the reference shape of the portable device. The portable device can configure the information on the reference shape according to the detected first position. The portable device can configure the shape of the portable device seen from the first position as the reference shape. By doing so, in case that the head mounted display detects the portable device at the first position, the head mounted display can detect the shape of the portable device identical to the reference shape. Hence, the front side of the augmented reality image displayed in the head mounted display in response to the reference shape of the portable device can face the first position. In case that the marker information includes the information on the reference shape of the portable device, the portable device may not display a separate marker and the head mounted display can detect a shape of the portable device as a marker.

The portable device can transmit the augmented reality image corresponding to the marker information to the head mounted display [S40]. The head mounted display can receive the augmented reality image corresponding to the marker information from the portable device. The portable device can transmit a face image of a sender of an incoming call to the head mounted display as an augmented reality image. The head mounted display can display the face image of the sender as the augmented reality image in a manner of receiving the transmitted augmented reality image. As mentioned earlier in the step [S30], the portable device can adaptively configure the marker information according to the first position of the head mounted display. Hence, a user wearing the head mounted display can look at the front side of the augmented reality image at the first position.

Figure 7:
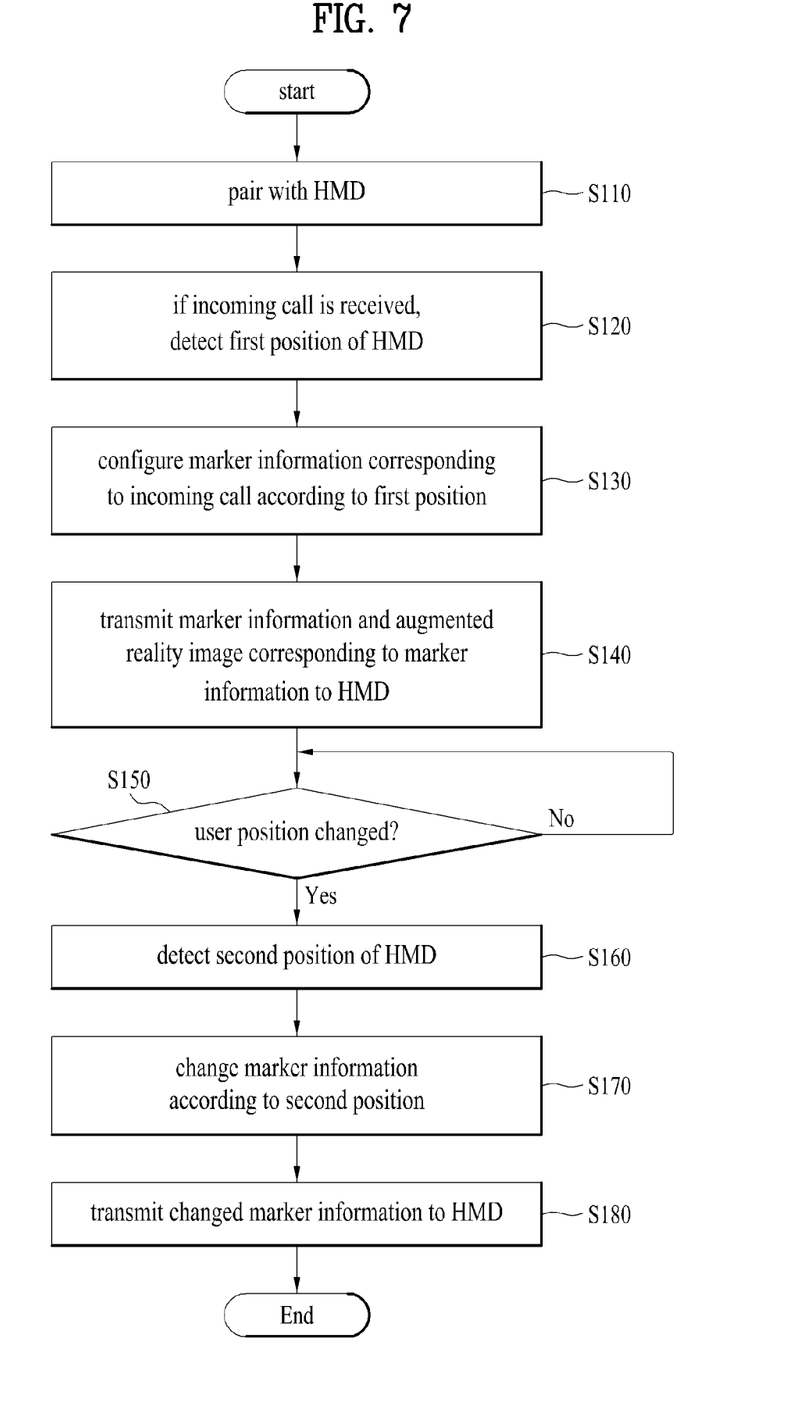
FIG. 7 is a flowchart for a method of controlling a portable device according to a different embodiment of the present specification.

FIG. 7 is a flowchart for a method of controlling a portable device according to a different embodiment of the present specification. The portable device can be paired with the head mounted display [S110]. The portable device can be paired with the head mounted display using a local area network (LAN), WiFi, or Bluetooth. A data can be transceived between the paired portable device and the head mounted display. For instance, the portable device may transceive a video data, an audio data, a GPS data, and the like with the head mounted display.

When an incoming call is received, the portable device can detect a first position of the head mounted display [S120]. As mentioned earlier in FIG. 1 to FIG. 4, the portable device can detect the first position of the head mounted display using a sensor unit or GPS information. The first position may mean a direction at which the head mounted display is positioned on the basis of the portable device. The portable device may not display a marker until the first position is detected.

The portable device can configure marker information corresponding to the incoming call according to the first position [S130]. As mentioned earlier in FIG. 1 to FIG. 4, the portable device can configure the marker information according to the first position. The marker information can include information on a marker displayed in the display unit of the portable device. The portable device can configure a display direction of the marker according to the detected first position. The portable device can display the marker in a manner of rotating the marker according to the configured marker information. The portable device can display the maker in a manner that the marker faces the first position. By doing so, the front side of the augmented reality image displayed in the head mounted display in response to the marker can face the first position.

According to a different embodiment, the marker information can include information on the reference shape of the portable device. The portable device can configure the information on the reference shape according to the detected first position. The portable device can configure the shape of the portable device seen from the first position as the reference shape. By doing so, in case that the head mounted display detects the portable device at the first position, the head mounted display can detect the shape of the portable device identical to the reference shape. Hence, the front side of the augmented reality image displayed in the head mounted display in response to the reference shape of the portable device can face the first position. In case that the marker information includes the information on the reference shape of the portable device, the portable device may not display a separate marker and the head mounted display can detect a shape of the portable device as a marker.

The portable device can transmit the augmented reality image corresponding to the marker information to the head mounted display [S140]. The head mounted display can receive the augmented reality image corresponding to the marker information from the portable device. The portable device can transmit a face image of a sender of an incoming call to the head mounted display as an augmented reality image. The head mounted display can display the face image of the sender as the augmented reality image in a manner of receiving the transmitted augmented reality image. As mentioned earlier in the step [S30], the portable device can adaptively configure the marker information according to the first position of the head mounted display. Hence, a user wearing the head mounted display can look at the front side of the augmented reality image at the first position.

The portable device can detect a position change of a user [S150]. As mentioned earlier in FIG. 3 to FIG. 4, the portable device can detect a position change of the head mounted display using the image sensor or GPS information of the head mounted display.

The portable device can detect a second position of the head mounted display [S160]. As mentioned earlier in FIG. 3 to FIG. 4, the portable device can detect the second position using the image sensor. The portable device may detect the second position in a manner of receiving the GPS information on the second position from the head mounted display. And, the portable device can detect whether an absolute position of the head mounted display is changed or a relative position is changed using the image sensor or the gyro sensor. If the absolute position of the head mounted display is changed according to embodiment, the portable device can perform operations explained in the following description.

The portable device can change the marker information according to the second position [S170]. As mentioned earlier in FIG. 4, the portable device can change a display direction of a marker included in the marker information according to the second position. The portable device can reconfigure the display direction of the marker to make the marker face the second position. Or, the portable device can reconfigure a reference shape of the portable device included in the marker information according to the second position. The portable device can reconfigure the shape of the portable device seen from the second position as the reference shape. Hence, in case that the head mounted display positioned at the second position detects the portable device using the camera unit, the head mounted display can detect the portable device of the reference shape.

The portable device can transmit changed marker information to the head mounted display [S180]. As mentioned earlier in FIG. 4, the portable device can update the marker information in a manner of transmitting changed or reconfigured marker information to the head mounted display. This operation can be performed only for a case that the information on the reference shape of the portable device included in the marker information is changed. In case that the display direction of the marker included in the marker information is changed or reconfigured, the portable device displays the marker according to a new display direction and the camera unit of the head mounted display can detect the change or the reconfiguration. Hence, the portable device may not transmit separate marker information to the head mounted display.

The head mounted display can display an augmented reality image based on the reference shape of the portable device included in the updated marker information. Since the shape of the portable device detected at the second position is identical to the updated reference shape, the head mounted display can display the augmented reality image of which the front side of the augmented reality image faces the head mounted display.

As mentioned in the foregoing description, the portable device of the present specification detects a position of the head mounted display before a videotelephony is started. When the videotelephony is started, the portable device can configure the marker information to make the front side of the augmented reality image face the head mounted display. And, the head mounted display of the present specification can display the front side of the augmented reality image for a user based on the marker or the marker information.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

What is claimed is:

1. A portable device, comprising:
   a communication unit configured to receive an incoming call and transmit information to a head mounted display (HMD) paired with the portable device, wherein the information includes a sender image received from a sender of the incoming call;
   a sensor unit configured to detect a direction of the HMD;
   a display unit; and
   a controller configured to:
   display a marker image for determining a position and a direction of an augmented reality image displayed on the HMD according to a first direction of the HMD paired with the portable device, and
   transmit the sender image to the HMD,
   wherein the augmented reality image represents the sender and is based on the sender image received from the portable device, and wherein a rotation or a movement of the augmented reality image corresponds to a rotation or a movement of the displayed marker image.

2. The portable device of claim 1, wherein the controller is further configured to transmit the marker image to the HMD.

3. The portable device of claim 1, wherein when the first direction of the HMD is changed to a second direction, the controller is further configured to:
   detect the second direction, and
   change the marker image according to the second direction of the HMD.

4. The portable device of claim 3, wherein the controller is further configured to rotate the marker image to make a front side of the augmented reality image face the second direction.

5. The portable device of claim 1, wherein the augmented reality image corresponds to a face of the sender of the incoming call.

6. The portable device of claim 1, wherein the HMD is configured to display the augmented reality image according to the marker image.

7. The portable device of claim 1, wherein when the first direction of the HMD recognized by the portable device is changed to a second direction due to a rotation or a movement of the portable device, the controller is further configured to maintain the displayed marker image without changing the displayed marker.

8. The portable device of claim 7, wherein the HMD is further configured to detect that the marker has rotated due to the rotation or the movement of the portable device and wherein the HMD is configured to rotate the augmented reality image according to the marker image of the rotated or moved portable device.

9. The portable device of claim 1, wherein when the first direction of the HMD recognized by the portable device is changed to a second direction due to a movement of the HMD, the controller is further configured to display the marker image by rotating the marker image in response to an angle between the first direction and the second direction.

10. The portable device of claim 1, wherein the HMD is configured to determine the direction of the augmented reality image further based on a shape of the portable device recognized by the HMD according to an angle between the portable device and the HMD.

11. The portable device of claim 10, wherein the HMD is further configured to recognize the shape of the portable device as the marker image corresponding to the augmented reality image.

12. The portable device of claim 10, wherein the controller is further configured to configure the shape of the portable device recognized by the HMD at the first direction as an reference shape and transmit the reference shape to the portable device.

13. The portable device of claim 12, wherein when the first direction of the HMD recognized by the portable device is changed to a second direction due to a rotation or a movement of the portable device, the controller is further configured to maintain the reference shape.

14. The portable device of claim 13, wherein the HMD is configured to display the augmented reality image by rotating the augmented reality image by an angle between the portable device and the HMD based on the reference shape.

15. The portable device of claim 12, wherein when the first direction of the HMD recognized by the portable device is changed to a second direction due to a movement of the HMD, the controller is further configured to change the reference shape in response to an angle between the first direction and the second direction.

16. The portable device of claim 15, wherein the reference shape is changed from the shape of the portable device recognized by a camera of the HMD at the first direction to the shape of the portable device recognized by the camera of the HMD at the second direction.

17. The portable device of claim 1, wherein the portable device corresponds to a smart phone, a smart pad, a music player, a notebook, a smart table, a monitor, a television, or a tablet computer.

18. A method of controlling a portable device, comprising the steps of:

pairing with a head mounted display (HMD);

detecting a first direction of the paired HMD when an incoming call is received;

displaying a marker image for determining a position and a direction of an augmented reality image displayed on the HMD according to the first direction of the HMD paired with the portable device; and transmitting a sender image received from a sender of the incoming call to the paired HMD, wherein the augmented reality image represents the sender and is based on the sender image received from the portable device, and wherein a rotation or a movement of the augmented reality image corresponds to a rotation or a movement of the displayed marker image.

* * * * *